United States Patent
Koryakin et al.

(10) Patent No.: US 10,180,855 B1
(45) Date of Patent: Jan. 15, 2019

(54) SYSTEM AND METHOD FOR CONTROLLING IDLE STATE OF OPERATING SYSTEM

(71) Applicant: Parallels International GmbH, Schaffhausen (CH)

(72) Inventors: Alexey Koryakin, Moscow (RU); Nikolay Dobrovolskiy, Moscow (RU); Serguei M. Beloussov, Costa Del Sol (SG)

(73) Assignee: Parallels International GmbH, Schaffhausen (CH)

( * ) Notice: Subject to any disclaimer, the term of this patent is extended or adjusted under 35 U.S.C. 154(b) by 95 days.

(21) Appl. No.: 15/620,902

(22) Filed: Jun. 13, 2017

(51) Int. Cl.
  *G06F 9/48* (2006.01)
  *G06F 12/08* (2016.01)

(52) U.S. Cl.
  CPC .......... *G06F 9/4831* (2013.01); *G06F 9/4887* (2013.01); *G06F 12/08* (2013.01); *G06F 2212/657* (2013.01)

(58) Field of Classification Search
  CPC .................................................. G06F 9/4831
  See application file for complete search history.

(56) References Cited

U.S. PATENT DOCUMENTS

2016/0124761 A1* 5/2016 Tsirkin ................ G06F 9/45545 718/1
2018/0308196 A1* 10/2018 Ray .......................... G06T 1/20

* cited by examiner

*Primary Examiner* — Charlie Sun
(74) *Attorney, Agent, or Firm* — Arent Fox LLP

(57) ABSTRACT

A system and method is provided for controlling an operating state of a virtual processor. An exemplary method includes determining a blocked state of a guest operating system, and, upon detecting the blocked state, determining a number of interrupt events during a first time period. If the number of interrupts is less than a first threshold or even zero during a first time period, the method includes protecting memory pages from execution by the virtual processor. Moreover, the method includes detecting, during a second time period, when the processor attempts to execute protected memory pages and unprotecting these protected memory page. Then, during a third time period, the method includes monitoring execution by the processor of the unprotected memory pages and maintaining the processor in an idle state based on the number of executed unprotected memory pages during the third time period.

20 Claims, 6 Drawing Sheets

SYSTEM AND METHOD FOR CONTROLLING IDLE STATE OF OPERATING SYSTEM

TECHNICAL FIELD

The present disclosure relates generally to managing computing system resources, and, more particularly, to a system and method for controlling the idle state of a computer operating system.

BACKGROUND

In virtual machine technology, a user can create and run multiple operating environments on a server at the same time. Each operating environment, or virtual machine, requires its own operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. At the same time, when many virtual machines are running on a single server, for example, it is important to maintain the virtual machines in an idle state for as much time as possible to decrease energy use and consumption of other computing system resources.

Generally, every modern (and most legacy) operating systems have a computing processing unit ("CPU") or process scheduler. During operation, the scheduler chooses a process and active threads from the process that are in a "ready to execute" state. When a new process is selected for execution, the scheduler initiates process and thread context switch to save the state of previous executed thread and then load a new thread. After the context switch, the "ready to execute" begins execution. At this point, the CPU executes code of the running thread until there is either a synchronous call to wait for some resource (or synthetic synchronization object) to be released or until there is an asynchronous hardware interrupt. For example, synchronous calls may be a Win32 API WaitForMultipleObject( ) or POSIX pthread_cond_wait( ) or other similar calls that causes the processor to enter a blocked state while it waits for some resource to be released or some conditional event to occur. Moreover, hardware interrupt events can happen, for example, as a result of some embedded device operation (e.g., a local APIC timer event, an IPI sent from one CPU to another CPU, or the like) or external peripheral device functioning (e.g., complete read operation from a hard disk).

In existing operating systems, when the process thread is in a state of waiting for some resource or condition, the thread will be moved to a "wait" state by the scheduler and the thread will remain in a blocked state until the requested resource becomes available. For a hardware interrupt, an OS interrupt handler will start execution and call a specific device driver (e.g., a kernel module extension) interrupt handler to perform the necessary interrupt processing for the device. The scheduler will then check the time quantum dedicated to the current process to ensure the time has not expired and, if so, it will pass control to the OS to return from interrupt routine to repair the interrupted thread context. However, if the time quantum has expired during the hardware interrupt event, the scheduler will push the interrupted thread from the "running" state to the "ready to execute" state in the back of the queue, select the next "ready to execute" thread, and then switch the context to the new thread.

To save energy and computing resources, the OS will normally enter an idle state when all (or most) of the processes and threads are in one of the blocked states and waiting for some condition. Usually, in hardware, this is implemented as a special processor state where the OS moves the CPU by executing a special instruction or series of instructions. For example, on the Intel IA-32, Intel 64 and AMD64 platform, a HLT ("halt") instruction is usually used for the guest OS to move the processor to the idle state. This instruction will put the processor to a low energy consumption state and will wait until some subsequent hardware interrupt happens before leaving the idle state. Sometimes this is done by a MONITOR/MWAIT instruction. Moreover, for ARM platform, the guest OS moves the processor to the idle state based on WFE or WFI instructions.

In a virtualized environment, the virtual machine monitor ("VMM") or hypervisor will emulate the corresponding instructions and place the virtual processor execution to the blocked state to wait for an emulated asynchronous event or timeout until some time-based event (e.g., an emulated timer device interrupt). One technical issue with this configuration is that the timeout for the sleep/blocked state of a virtual processor is calculated in accordance with the nearest emulated hardware time event (e.g., an interrupt of emulated PIT, local APIC timer, CMOS, or the like). Moreover, each virtual processor sleep and wake up transition takes time to execute additional state transition codes. Furthermore, when the guest OS is in a deep idle state (especially for conventional non-tickless OSs), the timer interrupt is raised only to increment certain counters, check for any unblocked processes and threads, and then pass the guest OS back to the sleep state again, by using the HLT or MONITOR/MWAIT instructions again, for example. Each transition into and out of the sleep state consumes useless time (i.e., in long sleep states without active threads) to execute guest interrupt handlers and driver codes, switcher processor states and, in case of virtualization, emulate excessive behavior.

SUMMARY

Thus, a system and method is disclosed herein for managing consumption of computing system resources, and, more particularly, for controlling the idle state of a computer operating system.

According to an exemplary aspect, a method is provided for controlling an operating state of a virtual processor. In this aspect, the method includes determining if a guest system has entered a blocked state by executing an instruction halting the virtual processor until the next interrupt; upon detecting the blocked state of the guest system, determining a number of interrupt events during a first time period; if the number of interrupts is less than a first threshold during the first time period, protecting a plurality of memory pages from execution by the virtual processor; detecting, during a second time period, when the virtual processor attempts to execute at least one of the plurality of protected memory pages; unprotecting the at least one protected memory page that the virtual processor attempts to execute during the second time period; monitoring execution by the virtual processor of the at least one unprotected memory page during a third time period; and maintaining the virtual processor in an idle state based on the number of executed unprotected memory pages during the third time period.

In another aspect, the method includes adding the at least one unprotected memory page to a list of executed memory pages.

In another aspect of the exemplary method, the monitoring comprises determining whether a number of the executed unprotected memory pages on the list does not increase during the third time period.

In another aspect, the method includes causing the virtual processor to leave the idle state and enter an active state when the number of the executed unprotected memory pages on the list increases during the third time period, wherein the active state comprises executing at least one thread by the virtual processor.

In another aspect of the exemplary method, the virtual processor is for a virtual machine and the plurality of memory pages are guest pages stored in virtual memory of the virtual machine.

In another aspect of the exemplary method, the protecting of the plurality of memory guest pages comprises setting an execute disable bit of at least one page table mapping the plurality of guest memory pages.

In another aspect of the exemplary method, the guest system enters the blocked state upon at least one of a synchronous call to wait for a computing resource and an asynchronous hardware interrupt.

In another aspect of the exemplary method, the determining that the guest system has entered the blocked state comprises detecting an HLT instruction for the virtual processor to enter the idle state.

In another aspect of the exemplary method, the determining of the number of interrupt events executed by the virtual processor comprises determining that only timer device interrupts occur during the first time period.

In another aspect, the exemplary method includes delaying the timer device interrupts when the virtual processor is in the idle state.

In another exemplary aspect, a system is provided for controlling an operating state of a virtual machine. In this aspect, the system includes virtual memory configured to store plurality of executable guest pages; a virtual processor configured to execute at least a portion of the plurality of executable guest pages; and a virtual machine monitor configured to determine if a guest system of the virtual machine has entered a blocked state, upon detecting the blocked state of the guest system, determine a number of interrupt events during a first time period, if the number of interrupts is less than a first threshold during the first time period, protect the plurality of memory pages from execution by the virtual processor, detect, during a second time period, when the virtual processor attempts to execute at least one of the plurality of protected memory pages, and unprotecting the at least one protected memory page that the virtual processor attempts to execute during the second time period, monitor execution by the virtual processor of the at least one unprotected memory page during a third time period, and maintain the virtual processor in an idle state based on the number of executed unprotected memory pages during the third time period.

In another exemplary aspect, a non-transitory computer readable medium comprising computer executable instructions is provided for controlling an operating state of a virtual processor. In this aspect, instructions are provided for determining if a guest system has entered a blocked state; upon detecting the blocked state of the guest system, determining a number of interrupt events during a first time period; if the number of interrupts is less than a first threshold during the first time period, protecting a plurality of memory pages from execution by the virtual processor; detecting, during a second time period, when the virtual processor attempts to execute at least one of the plurality of protected memory pages; unprotecting the at least one protected memory page that the virtual processor attempts to execute during the second time period; monitoring execution by the virtual processor of the at least one unprotected memory page during a third time period; and maintaining the virtual processor in an idle state based on the number of executed unprotected memory pages during the third time period.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
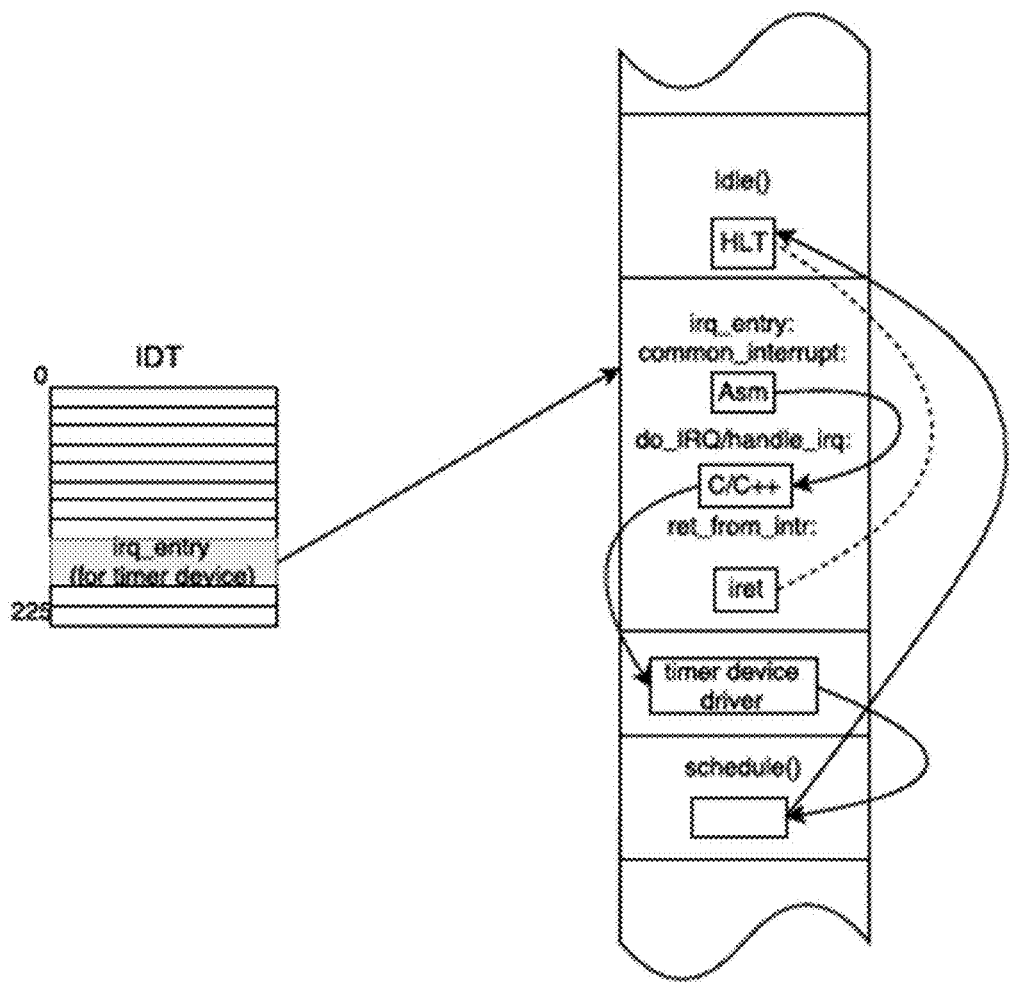
FIG. 1 illustrates a simplified flow diagram of executed idle system code.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described above, to save battery life and maximize use of computing resources, most processes and applications are designed to enter and remain in a blocked state until some event occurs. As a result, for 99% of execution time, the computer operating system is waiting for hardware interrupts on HLT instructions. For example, on legacy and semi-modern operating systems, processes configuration involve periodic a hardware timer interrupt that mostly interrupts the execution of the HLT instruction. This state can generally be considered an idle systems state. For modern tickless operating systems, there is no periodic hardware timer. Instead, the timer interrupt occurs when some process subscribes a deadline or upon a timeout. The idle system may spend dozens of milliseconds, for example, on a single HLT instruction waiting for an interrupt. In either case, after the timer interrupt is handled, and if there are no threads passed from a blocked state to a "ready to execute" state, the system enters a deep sleep state again when another HLT instruction is executed. In this process configuration, the program code executed during the idle system state involves relatively few instructions where the code is always the same and located on the same executable memory pages.

FIG. 1 illustrates a simplified flow diagram of executed idle system code. In particular, an example of the Linux kernel 4.8.12 for the interrupt handling code (i.e., for Intel 64 processor architecture, such as x86_64) is illustrated as follows:

irq_entry:
    jmp to common_interrupt
    common_interrupt:
    call do_IRQ
    do_IRQ:
    call handle_irq
    handle_irq:
    call generic_handle_irq_desc
    generic_handle_irq_desc:
    TBD
    ret_from_intr (i.e., as a part of common_interrupt code):
    call prepare_exit_to_usermode (e.g., executed if there is active thread of user space process)
    prepare_exit_to_usermode (e.g., executed if there is active thread of user space process)
    call schedule
    native_irq_return_iret (as a part of common_interrupt code):
    IRET Thus, as shown in FIG. 1, the processor first enters an idle state by execution of a HLT instruction. The OS interrupt handler will start execution and call the timer driver interrupt handler to perform the necessary interrupt processing for the device. The scheduler of the operating system will then check to determine if there any threads in a "ready to execute" state, and, if not, a return from the interrupt will be performed by a IRET instruction back to the HLT instruction. Thus, if there are no threads in a "ready to execute" state, the limited OS code portion is executed even while there is no code useful to execute inside the OS. As such, the OS can be considered to be in a system wide idles state because all processes and threads are effectively in a "wait" state and not "ready to execute". For example, every process may be waiting for an I/O operation completion, waiting for a timer period to elapse, waiting for a key/mouse input with the GUI inactive, waiting for some synchronous object to be released, or the like. Thus, when the OS executes the HLT instruction, the processor is placed in a low power consumption state until the next hardware interrupt or another asynchronous sensitive event is injected.

According to an exemplary aspect, the disclosed system and method is provided to delay or even ignore certain types of asynchronous events that would otherwise wake up the processor from the idle state when there are no "ready to execute" processes/threads. As will be described in detail below, the system and method is configured to control the idle system state behavior of a processor based on an absence of "ready to execute" processes/threads and does not depend on process content. As a result, the system and method can prevent all executable memory pages from execution except for a few pages, such as pages provided for timer interrupt handling for the time of the idle system. Moreover, if the OS attempts to execute a "non-idle" page or the scheduler changes the state of a process/thread from a blocked state to a "ready to execute" state, execution of the protected page(s) will raise a page fault exception. In this instance, the system and method detects the move from an idle system state to an active state and releases protection of the protected page(s). Based on the algorithms described herein, a universal criteria is provided for detecting idle system states for most operating systems. When the system is in the idle state, it only executes "idle" pages. Otherwise, the system exits the idle state and returns to the active state.

Figure 2A:
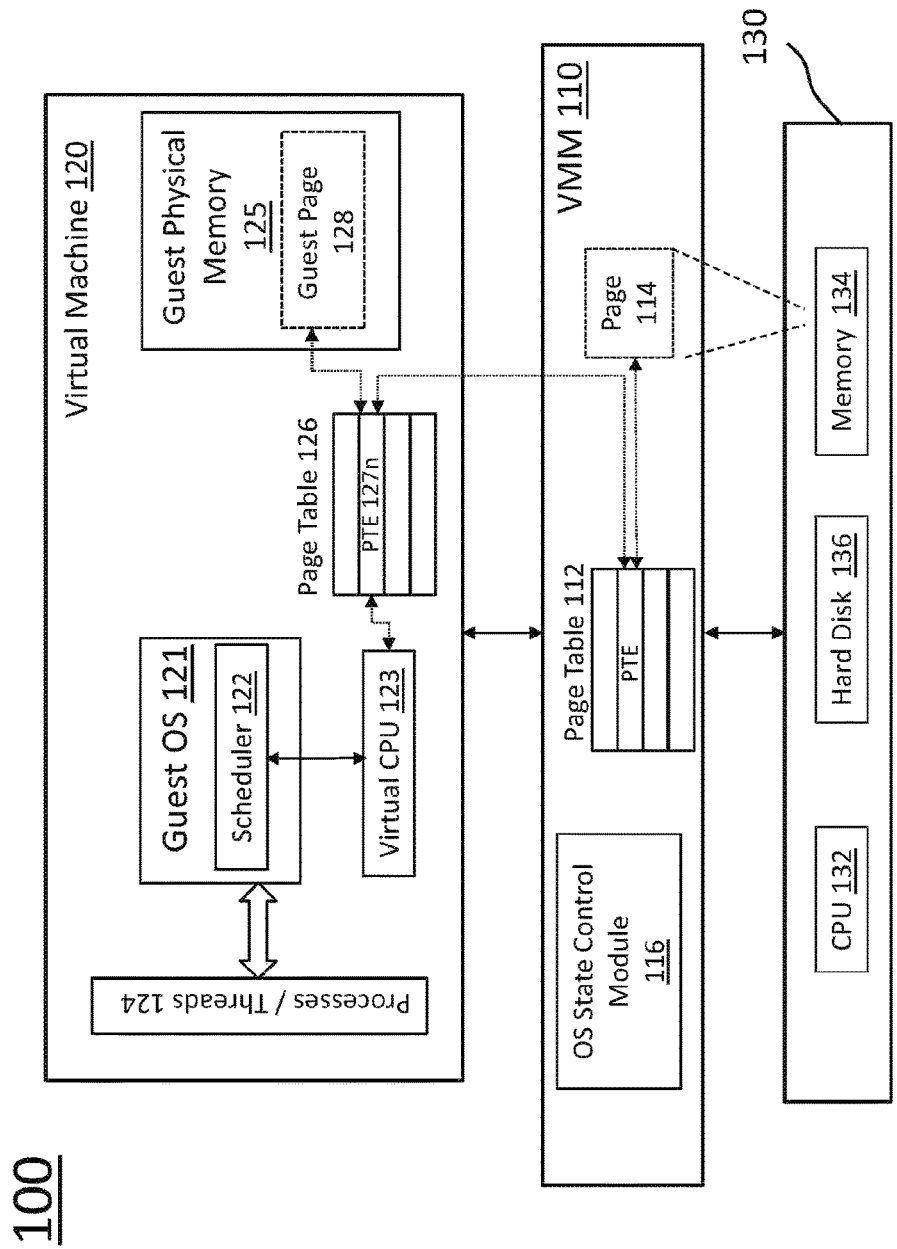
FIGS. 2A and 2B illustrate block diagram of exemplary systems for controlling the idle state of a computer operating system according to an exemplary aspect.

FIG. 2A illustrates a block diagram of a system for controlling the idle state of a computer operating system according to an exemplary aspect. In general, one or more virtual machines 120 can be installed on a host platform (generally shown as system 100) that includes system hardware 130, a host operating system or kernel (not shown) and a virtual machine monitor 110, which is also known as a hypervisor. The virtual machine monitor 110 (hereinafter referred to as "VMM 110") can be computer software, firmware, and/or hardware, that creates and runs the virtual machine 120. The VMM 110 provides the guest OS 121 of the virtual machine 120 with a virtual operating platform and manages the execution of the guest OS 121.

As shown, the system hardware 130 of the host machine can include a computer processing unit 312, memory 134 (e.g., random access memory) and a hard disk 136. The host machine will normally include additional devices, software modules, and the like, as would be appreciated to one skilled in the art, but are not shown herein so as to not unnecessarily obscure the aspects of the disclosure. As software, the code for the VM 120 will typically execute on the actual system hardware 130.

In the exemplary aspect, the virtual machine 120 has both virtual system hardware and guest system software, including the guest OS 121. The virtual system hardware can include guest physical memory 125, a virtual CPU 123, as well as other hardware components, such as a virtual disk (not shown), and the like. It is noted that all of the virtual hardware components of the virtual machine 120 can be implemented in software to emulate corresponding physical components, as would be appreciated to on skilled in the art.

As further shown, the guest OS 121 of the virtual machine 120 will include a process scheduler 122 that determines which process runs by the virtual CPU 123 at a certain point in time. In general, the process scheduler 122 is configured to pause the execution of processes, move the processes to the end of the running queue and start new processes, as is described herein. During operation, the process scheduler 122 will choose a process and active threads (shown as processes/threads 124) from the process that are in a "ready to execute" state in a similar manner as described above.

The VMM 110 provides the interface between the guest software within the VM 120 and the hardware components and devices in the underlying hardware platform 130 of the host machine. To control memory management during operation of the VM 120, when an application (e.g., process or thread 124, discussed below) requests an executable page of memory, the guest OS 121 will allocate memory in a virtualized guest address space of the guest physical memory 125. After that, the allocated guest page 128 is mapped to guest page table 126 through correspondent guest page table entry 127*n*. These guest physical memory pages are reflected to a host physical address space. In general, a guest physical address is not equal to a host physical one 134. As shown in FIG. 2A, the exemplary aspect is provided for VMM configuration mapping guest pages to virtual address space by using so called paging cache technique, as described, for example, in U.S. Pat. No. 7,596,677, entitled "Paging cache optimization for virtual machines", the contents of which are hereby incorporated by reference. In this regard, the VMM 110 can maintain a paging structures, including one or more page table hierarchies 112 (e.g., two-level page tables in IA-32 legacy paging mode, three-level page tables in PAE mode, four-level page tables in IA-32e paging mode and the like) that organize the relationships between the two address spaces and that map particular host memory pages 114 reflecting state of guest physical memory pages 128 to guest virtual memory address space of the second memory address space of the physical memory 134, for example. Thus, during operation, when an active thread of a process 124 attempts to access a page 128 by guest linear address described by correspondent page table entries 127*n*, the page table 112, which may include a plurality of page table entries, will map the guest physical page 114 (allocated from the guest physical memory 134) to the guest linear address space. Thus access to guest pages are controlled through a maintenance of particular PTEs in page tables 112. It should be appreciated that the page mapping may include additional data structures, such as a control register 3 (CR3), page tables, page directories, page directory pointer tables and the like. An exemplary page mapping is shown U.S. Pat. No. 7,598,677, the entire contents of which are hereby incorporated by reference.

When the guest OS 121 is running on the virtual machine 120, the guest OS 121 can treat the guest physical memory 125 as if it were the physical memory of a computer system. In this regard, the guest OS 121 can create virtual memory address spaces and map these address spaces to the guest physical memory 125. Thus, the guest OS 121 can also maintain a paging structure, including page table 126 that includes page table entries 127*n* mapping the virtual memory address spaces to the address spaces in the guest physical memory 125. Thus, as further shown, when the process scheduler 122 selects an active thread 124 that is in "ready to execute" state", the guest OS 121 can retrieve one or more "guest pages" 128 in guest physical memory 125 according to the page mapping set forth in page table 126.

As will be described in detail below, the VMM 110 is configured to monitor the guest OS 121 and execution of guest pages 128 and, based on the number of executed guest pages, control the idle state of the virtual machine 120 according to the exemplary aspect. In this regard, the VMM 110 includes an OS state control module 116 that is configured to protect/unprotect (i.e., release from the protected state) the execution of guest pages and monitor the execution thereof. The OS state control module 116 is configured to perform the algorithms disclosed herein including monitoring each thread executed by the processor (e.g., virtual processor 123). As described below in detail, the OS state control module 116 is configured to protect execution of guest pages and also create or maintain a list of executed (or attempted to be executed) guest pages by the guest OS 121. Moreover, the list of executed pages stays below a certain number (i.e., a given threshold) during a set period of time, the OS state control module 116 can place the virtual processor 123 in a long idle system state and delay the execution of insignificant events, such as certain types of interrupts, for example. As a result, the OS state control module 116 is capable of delaying and/or preventing the continuous transition of the virtual processor 123 from an active state to an idle state, and so forth, which unnecessarily consumes computing resources and wastes energy.

Figure 2B:
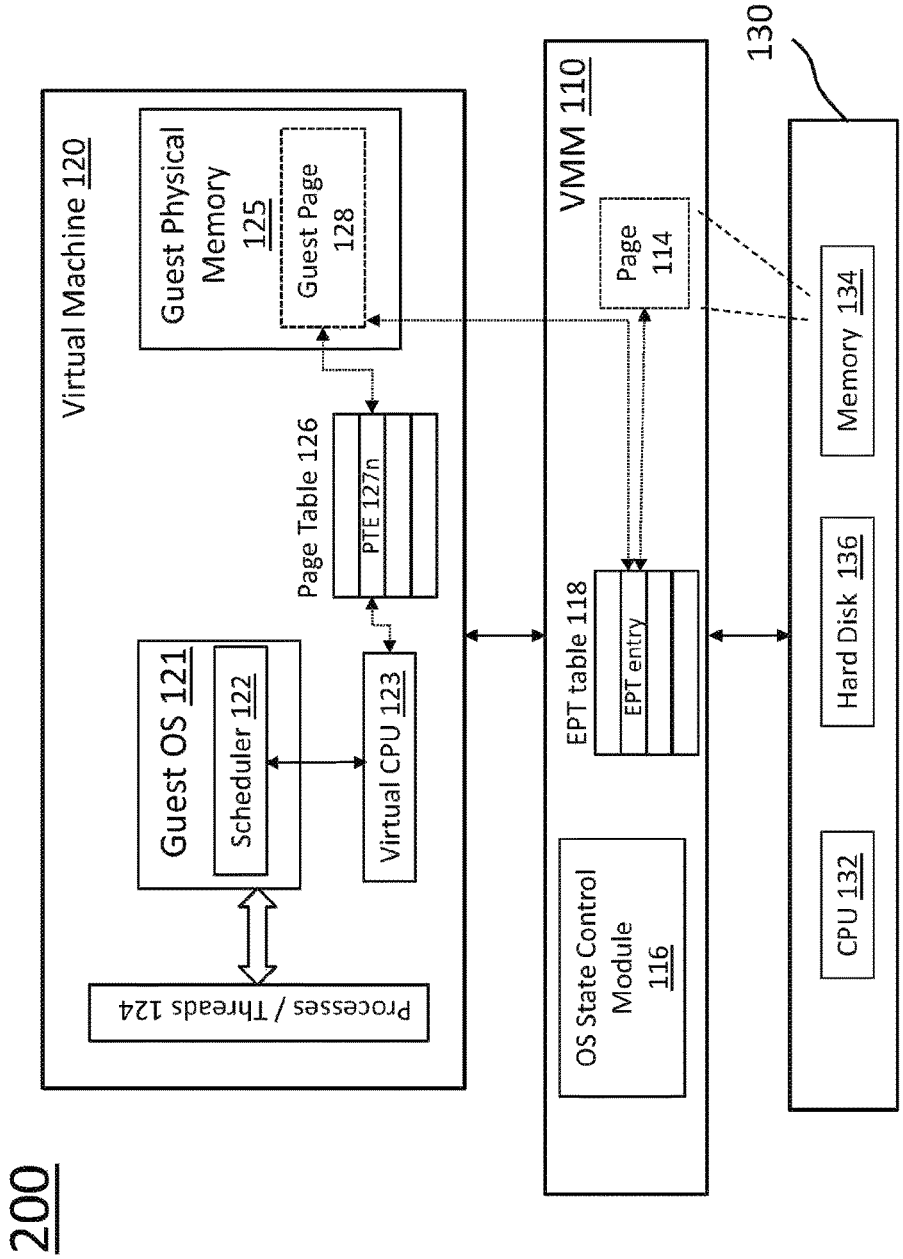

FIG. 2B illustrates another block diagram of a system for controlling the idle state of a computer operating system according to a refinement of the exemplary aspect. In general, FIG. 2B illustrates many of the same components as described above with respective to FIG. 2A, the details of which will not be repeated herein. According to the exemplary aspect of FIG. 2B, the system 200 is working in cooperation with hardware assisted nested paging technique (e.g., Intel EPT or AMD RVI). In this aspect, the nested paging technology provides an intermediate translation level from guest physical addresses (i.e., guest page 128) to real physical addresses (i.e., page 114). Additionally, nested paging also provides a way to protect guest physical pages from different type of guest OS accesses, such as read, write, execute, no access, for example. Thus, using nested paging does not require software assisted page table entries substitution like in paging cache technique. Rather, EPT page tables 118 are invisible for the guest OS 121. The particular entry of EPT table 118 maps real pages to guest physical address space by using host physical addresses in accordance with page allocation provided by the host OS. Therefore, each time the guest OS accesses a page by using virtual address space and mapped to virtual space through correspondent PTE 127*n*, the processor uses additional guest to host physical addresses translation described by EPT entries. Thus, FIG. 2B illustrates another hardware assisted method for protecting and manipulating guest physical pages according to an exemplary aspect. It should be appreciated that additional paging cache structures 112 are not required.

In general, the term "module" as used herein can refer to a software service or application executed as part of the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 3A:
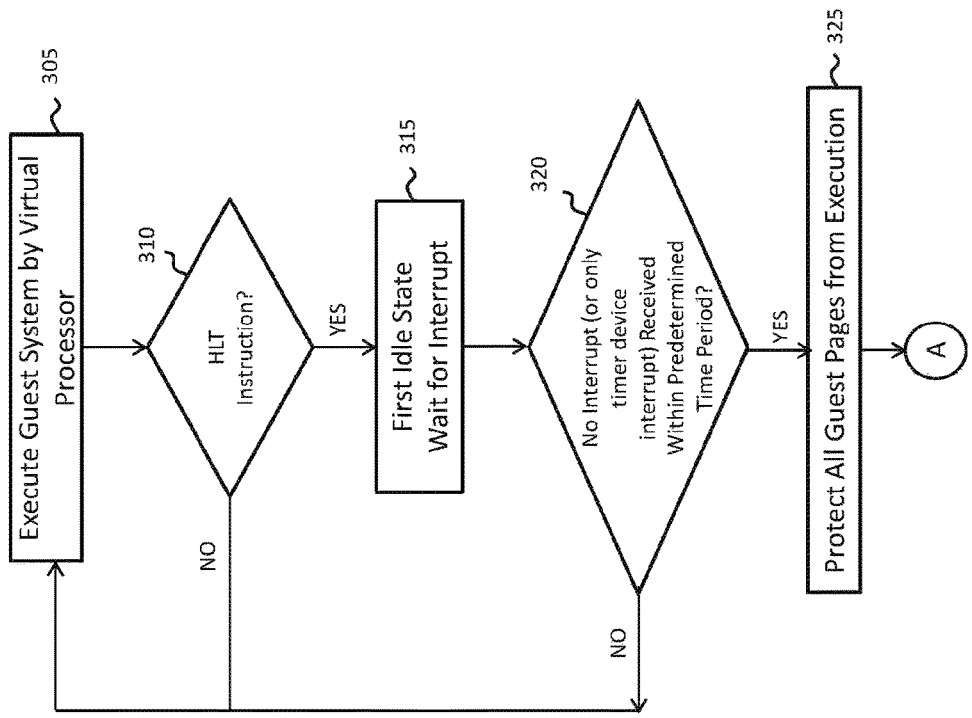
FIGS. 3A and 3B illustrate a flowchart for a method for controlling the idle state of a computer operating system according to an exemplary aspect.
Figure 3B:
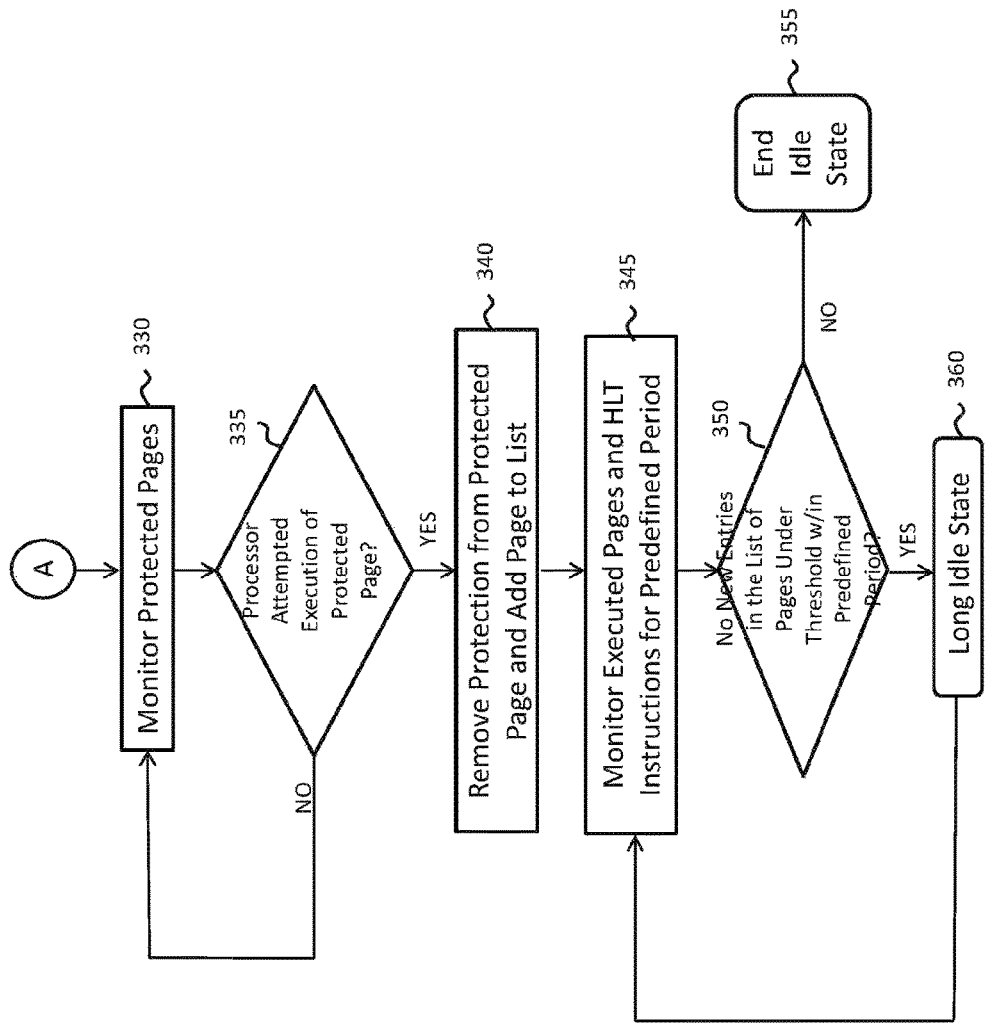

FIGS. 3A and 3B illustrate a flowchart for a method for controlling the idle state of a computer operating system according to an exemplary aspect. It should be appreciated that the following description of the exemplary method makes reference to the system and components described above. As shown, initially at step 305, the virtual machine 120 is in an active state in which the process scheduler 122 of the guest OS 121 is controlling the execution of active threads of a process 124 by virtual processor 123, for example. During execution of an active thread by virtual processor 123, the thread is executed until there as a synchronous call to wait for some resource or there is an asynchronous hardware interrupt, as described above, in which case the thread and/or the guest OS 121 itself can be considered to be in a "blocked" state. If the thread and/or guest OS 121 is blocked and a HLT instruction is executed by the guest OS 121 at step 310, the virtual processor 123 will enter a first idle system state, while the guest OS 121 waits for an interrupt of the HLT instruction. For purposes of clarity, it is shown that if the thread is not blocked at step 310, the thread continues to be executed by the virtual processor 123 in a loop as shown in FIG. 3.

As further shown, at step 320, the VMM 110 is configured to monitor the guest interrupt flow and determine whether any interrupt occurs within a predefined period. This predefined time period may be set by a system administrator, for example, and stored in local memory (e.g., memory 134) of the host for the virtual environment, for example. If there are no guest hardware interrupts (or only timer device interrupts from a single device) that are detected at step 320, the method proceeds to step 325 where all of the executable guest pages are protected (i.e., placed in a protected or blocked state) by the VMM 110. Otherwise, if a hardware interrupt is detected during this predetermined time period, the guest OS 121 returns to a fully active state and the process scheduler 122 begins thread execution again at step 305 as further shown.

It is noted that according to an exemplary aspect, the predetermined time period is adaptable/configurable to detect whether the guest OS 121 is in the long idle system state. For example, the predetermined time period can be set up empirically in accordance with typical behavior of the correspondent guest OS and adaptable to host OS general CPU usage. In case of extensive general CPU usage on the host (e.g., from any kind of non-virtualization and virtualization loads), the idle period can be tuned to state longer time in deep idle state to give this time to other CPU consumers. That is, the adaptable period can be used to avoid false excessive protections where all processes would otherwise be block until just the fast device I/O operation execution, such as SSD data block read, GPU drawings, and the like. In such cases, there is no thread to execute only for a short time period because such devices process I/O operation and generate hardware interrupts within a short time period, such that the system will not be stuck in an idle state for a long time. Thus, there is no reason to force the system into the long idle system state. Rather, the exemplary system and method is provided to delay insignificant events (e.g., timer interrupts as described above) of which delay in execution will not lead to operation errors. In most cases, the delayed interrupt will be executed later. Moreover, if a process was subscribed to a particular elapsed time period, the subscriber code will execute with a delay. The long idle system state of the virtual processor 123 121 will be reset to a normal active mode until the next long time period of inactivity (i.e., the method will return to step 305).

According to the exemplary aspect, at step 325, the VMM 110 is configured to protect all guest pages from execution that would otherwise be executed by the guest operating system 121. This can be done by using hardware assisted virtualization capabilities. For example, in an aspect, for x86 virtualization, page-table virtualization can be provided by Intel's Extended Page Table (EPT) feature and/or AMD's Rapid Virtualization Indexing (RVI) feature, for example. These extensions provide alternative guest-to-physical address translation by using nested page tables that also have an "Execute" access bit.

According to an exemplary aspect, protection is set in nested page tables for EPT/RVI enabled modes. Alternatively, if the processor extension is not used by virtualization software, the VMM 110 uses processor paging tables to organize these guest to real page mappings, as also described in U.S. Pat. No. 7,596,677. Thus, for EPT nested page table entries, the guest pages can be protected by setting bit 2 (and bit 10) if "mode-based execute control for EPT" VM-execution control is enabled when hardware assisted Intel VMX mode is used), or by setting the XD bit (or the NX bit for AMD processors) in all page table entries in paging cache memory virtualization mode. By doing so, all guest pages (e.g., guest page 128 and/or memory page 114) becomes available for data access, but are protected for code execution.

Once each guest page has been protected by VMM 110 at step 325, it is protected from execution in the page table (e.g., page table 126) or nested page table entry (e.g. EPT table 118). Next, at step 330, the VMM 110 monitors each page and determines at step 335 whether the virtual processor 123 has attempted to execute a protected page (e.g., guest page 128) during a predetermined period. These steps are shown in a continuous loop as the VMM 110 monitors the guest pages. Each time the virtual processor 123 attempts to execute an instruction located on a protected guest page, a page fault or VM-Exit occurs at step 335 and the method proceeds to step 340. That is, for EPT/RVI enable modes, a EPT fault VM-Exit occurs. Alternatively, if the processor extension is not being used by the virtualization software, a page fault exception (e.g., number 14 in x86 compatible architecture) is raised by the processor automatically because of the protection violation.

Upon occurrence of the VM-Exit or the page fault, the VMM 110 removes protection from the protected page and adds the page to a list of list of executed pages at step 340. That is, the OS state control module 116 of the VMM 110 can create and maintain a list of executed pages by the virtual processor 123. Moreover, in this regard, it should be understood that before the first guest instruction is executed (i.e., right after step 325), the list of executed pages maintained by the VMM 110 is empty. Moreover, according to an exemplary aspect, all memory pages counted by the monitoring algorithm of the VMM 110 during this second time period are then unprotected, for example, by removing the "Execute Disable" bit in a similar manner as the blocking procedure described above. Therefore, these unprotected guest pages can subsequently be executed by the virtual processor 123 without protection violation exits and page faults. Moreover, according to an exemplary aspect, to create and update the list, the monitoring algorithm of the VMM 110 will add a reference (i.e., page physical or linear address) of the guest page to the list of executed pages. Then, the VMM 110 restarts the instruction execution so that the VM-Exit will not happen again the next time the guest OS 121 attempts to execute the previously protected guest page.

As further shown, at step 345, the VMM 110 continues to monitor the executed pages and the HLT instructions for another predetermined period of time (i.e., a third time period). If the list of executed pages remains constant or is under a predetermined threshold during a predetermined period at step 350, the virtual processor 123 can be considered to enter a long idle system state at step 360. This is because the VMM 110 has determined that only insignificant events (e.g., timer interrupts) have occurred during this time period. As further shown, the monitoring process can then continually repeat at step 345 and so forth. As described above, in the idle system state, insignificant events such as timer interrupts can be delayed to minimize consumption of computing system resources. However, once the number of executed pages does not remain constant or increases over the predetermined threshold during the third time period, the idle system state is exited at step 355 and the virtual processor 123 returns to a fully active state where the next "ready to execute" thread is scheduled by the process scheduler 122 and executed by the virtual processor 123.

Accordingly, the disclosed system and method is advantageously able to detect the absence of "ready-to-execute" processes/thread by monitoring the number of executed guest pages during a predetermined time period. Moreover, the system and method enables long idle state optimizations if the set of executed memory pages is short (as determined at step 350) and is kept the same (or below a given threshold) for the given period of time and includes HLT instruction in the loop. In addition, while the exemplary aspect is contemplated as being for legacy operating system or an operating system that otherwise uses timer interrupts to check for any unblocked processes and threads, the disclosed system and method can also be used with tickless OS in which the timer interrupts do not occur at regular intervals and are only delivered as required.

According to a refinement of the exemplary aspect, the time period can be tracked by the VMM 110 in one of three possible ways. That is, the VMM 110 is configured to monitor the execution (attempted execution) of guest pages 128 by the guest OS 121. In one exemplary aspect, the VMM 110 can track time of one of more of the predetermined time periods by using calendar real time (i.e., CMOS time) of the computing system of the host machine, for example. In this aspect, the CMOS time can be corrected by special guest OS tools usually called as time-synchronization tool, which is provided to correct the real-time CMOS time counter. Moreover, the VMM 110 can be configured to track time using timer interrupts to raise short fine-tuned time-based event subscriptions (e.g., OS scheduler interrupting the CPU consuming thread, the closest synchronization object timeout, and the like). Finally, the VMM 110 can be configured to track time using hardware time relevant counters (e.g., PITO counters, time stamp counters, and the like). In this aspect, the counter is usually used as deltas on short term measurements and can be an addition to first two methods described above.

As described above, the VMM 110 is configured to control the operating state of the virtual machine 120, include the virtual processor 123 and to delay insignificant events. In general, in overcommit condition of the virtual processor 123 where the virtual machine 120 cannot get processor time quantum to execute guest code, some interrupts can be significantly delayed. The exemplary system and method can compensate these interrupts if the delay is not too significant. Moreover, in one aspect, if the delay is too large (i.e., over a certain time period), the VMM 110 can simply ignore the corresponding interrupt, but this will not result in errors of the guest OS 121, since time sensitive checks are executed in another path, but also with a delay due to the overcommit condition of the virtual processor 123). However, using the exemplary system and method disclosed herein I/O device timeouts and IPI timeouts can be avoided, which may happen when device operation virtualization is delayed so much that time-based timeout happens.

Figure 4:
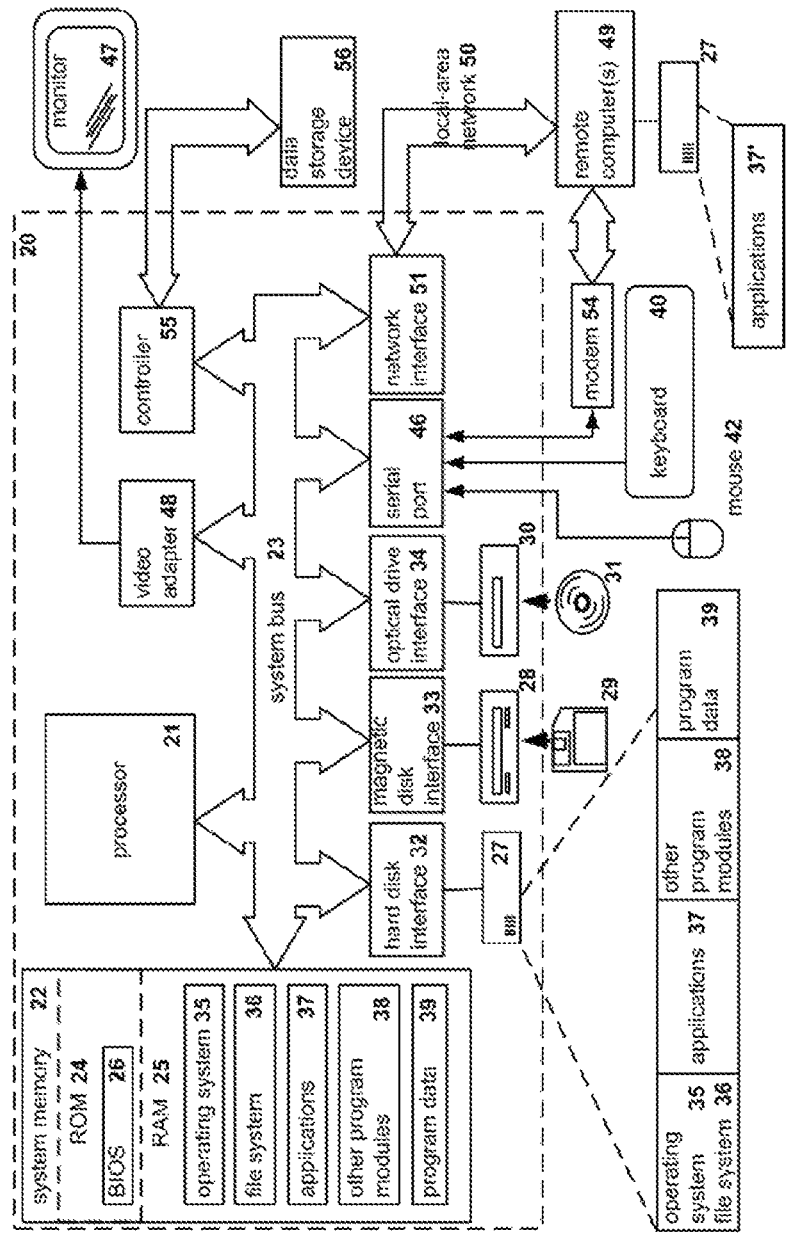
FIG. 4 illustrates a block diagram of an example of a general-purpose computer system on which the disclosed system and method can be implemented according to an exemplary aspect.

FIG. 4 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the host device described above, processing unit 21 can correspond to CPU 1322, and system memory 22 and/or file system 36 can correspond memory 134.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 (corresponding to hard disk 136, for example) for reading from and writing to a hard disk (e.g., hard disk 136), a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling an operating state of a virtual processor, the method comprising:
    determining if a guest system has entered a blocked state by executing an instruction halting the virtual processor until the next interrupt;
    upon detecting the blocked state of the guest system, determining a number of interrupt events during a first time period;
    if the number of interrupts is less than a first threshold during the first time period, protecting a plurality of memory pages from execution by the virtual processor;
    detecting, during a second time period, when the virtual processor attempts to execute at least one of the plurality of protected memory pages;
    unprotecting the at least one protected memory page that the virtual processor attempts to execute during the second time period;
    monitoring execution by the virtual processor of the at least one unprotected memory page during a third time period; and
    maintaining the virtual processor in an idle state based on the number of executed unprotected memory pages during the third time period.

2. The method of claim 1, further comprising adding the at least one unprotected memory page to a list of executed memory pages.

3. The method of claim 2, wherein the monitoring comprises determining whether a number of the executed unprotected memory pages on the list does not increase during the third time period.

4. The method of claim 3, further comprising causing the virtual processor to leave the idle state and enter an active state when the number of the executed unprotected memory pages on the list increases during the third time period, wherein the active state comprises executing at least one thread by the virtual processor.

5. The method of claim 1, wherein the virtual processor is for a virtual machine and the plurality of memory pages are guest pages stored in virtual memory of the virtual machine.

6. The method of claim 5, wherein the protecting of the plurality of memory guest pages comprises setting an execute disable bit of at least one page table mapping the plurality of guest memory pages.

7. The method of claim 1, wherein the guest system enters the blocked state upon at least one of a synchronous call to wait for a computing resource and an asynchronous hardware interrupt.

8. The method of claim 1, wherein the determining that the guest system has entered the blocked state comprises detecting an HLT instruction for the virtual processor to enter the idle state.

9. The method of claim 1, wherein the determining of the number of interrupt events executed by the virtual processor comprises determining that only timer device interrupts occur during the first time period.

10. The method of claim 9, further comprising delaying the timer device interrupts when the virtual processor is in the idle state.

11. A system for controlling an operating state of a virtual machine, the system comprising:
    an electronic memory configured to provide a virtual memory for storing a plurality of executable guest pages;

a hardware processor configured to execute a virtual processor for executing at least a portion of the plurality of executable guest pages; and a virtual machine monitor configured to:

determine if a guest system of the virtual machine has entered a blocked state, upon detecting the blocked state of the guest system, determine a number of interrupt events during a first time period, if the number of interrupts is less than a first threshold during the first time period, protect the plurality of memory pages from execution by the virtual processor, detect, during a second time period, when the virtual processor attempts to execute at least one of the plurality of protected memory pages, unprotecting the at least one protected memory page that the virtual processor attempts to execute during the second time period, monitor execution by the virtual processor of the at least one unprotected memory page during a third time period, and maintain the virtual processor in an idle state based on the number of executed unprotected memory pages during the third time period.

12. The system of claim 11, wherein the virtual machine monitor is further configured to add the at least one unprotected memory page to a list of executed memory pages.

13. The system of claim 12, wherein the virtual machine monitor is further configured to determine whether a number of the executed unprotected memory pages on the list does not increase during the third time period.

14. The system of claim 13, wherein the virtual machine monitor is further configured to cause the virtual processor to leave the idle state and enter an active state when the number of the executed unprotected memory pages on the list increases during the third time period.

15. The system of claim 11, wherein the virtual machine monitor is configured to protect the plurality of memory guest pages by setting an execute disable bit of at least one page table mapped to the plurality of memory guest pages.

16. The system of claim 11, wherein the guest system enters the blocked state upon at least one of a synchronous call to wait for a computing resource and an asynchronous hardware interrupt.

17. The system of claim 11, wherein the virtual machine monitor is further configured to run the at least one thread and detect an HTL instruction for the virtual processor to enter the idle state.

18. The system of claim 11, wherein the virtual machine monitor is further configured to determine the number of interrupt events executed by the virtual processor by determining that only timer device interrupts occur during the first time period.

19. The system of claim 9, wherein the virtual machine monitor is further configured to delay the timer device interrupts when the processor is in the idle state.

20. A non-transitory computer readable medium comprising computer executable instructions for controlling an operating state of a virtual processor, including instructions for:

determining if a guest system has entered a blocked state;

upon detecting the blocked state of the guest system, determining a number of interrupt events during a first time period;

if the number of interrupts is less than a first threshold during the first time period, protecting a plurality of memory pages from execution by the virtual processor;

detecting, during a second time period, when the virtual processor attempts to execute at least one of the plurality of protected memory pages;

unprotecting the at least one protected memory page that the virtual processor attempts to execute during the second time period;

monitoring execution by the virtual processor of the at least one unprotected memory page during a third time period; and maintaining the virtual processor in an idle state based on the number of executed unprotected memory pages during the third time period.

* * * * *